UNITED STATES PATENT OFFICE 2,070,171

PROCESS FOR THE PURIFICATION OF EXTRACTED HONEY

Rex E. Lothrop, Clarendon, Va., and Howard S. Paine, Chevy Chase, Md., dedicated to the free use of the Public No Drawing. Application January 26, 1935, Serial No. 3,608

6 Claims. (Cl. 99—146)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to us of any royalty thereon.

We hereby dedicate the invention herein described to the free use of the public, to take effect upon the granting of a patent to us.

As is generally known, extracted honey contains finely divided particles of various substances that remain suspended throughout the honey, and impart to it a distinctly cloudy or turbid appearance. In addition extracted honey frequently contains minute air bubbles that contribute to its cloudy or turbid appearance.

The presence of these particles not only detracts from the general appearance of honey after it is packaged due to the turbidity they produce, but in addition contribute to surface foam and scum formation which is also objectionable from the standpoint of appearance. They also appear to play a part in hastening granulation of bottled honey, which it is always desirable to retard as long as possible.

In order to overcome or partially overcome some of these objectionable characteristics of honey, packers usually subject extracted honey to some form of processing before it is bottled. This generally consists of heat treatment, which greatly reduces the viscosity of the honey, so that part of the suspended air bubbles and the more grossly suspended particles tend to rise to the surface where they form a scum and can be removed. Such treatment results in very imperfect clarification, however, so that the honey remains distinctly turbid, and the tendency for formation of surface scum layers still exists after treatment. Due to the manner of heating, which is usually carried out in large tanks, the honey is kept under heat treatment for a considerable period of time, with resulting danger of injury to the delicate flavor, and may cause some darkening in color, both of which greatly reduce the market value of the product.

Heretofore, no method has existed by which extracted honey can be processed without modification or loss of flavor. Furthermore, no method has existed by which extracted honey can be rendered reasonably clear and free from air and suspended material. Attempts which have been made heretofore to filter honey through a filter press have been unsuccessful because of such factors as adverse effect on flavor, necessity for diluting the honey with water, and either inadequate degree of clarity or unsatisfactory filtration rates.

A careful study has been made of the chemical composition of, and the influence exerted on its properties by, the suspended and colloidal particles of honey. Attempts to clarify honey by use of coagulants have been made, but due to the necessity of diluting the honey with water before so treating, considerable loss of flavor is incurred in concentrating it back to original density. These investigations are described in publications in "Industrial & Engineering Chemistry", vol. 23, pp. 328–32 (1931), and vol. 26, pp. 73–81 (1934). These studies indicate that the removal of the suspended particles which constitute only a small fraction of the honey (usually less than 0.1%) does not remove anything which would reduce its value as a food. In fact the presence of these particles appears to be more or less incidental.

While our process consists largely of utilizing certain well known manipulations, the fact that honey differs so greatly from other similar saccharine liquids that are customarily subjected to somewhat similar treatment necessitates the employment of special modifications of these procedures, otherwise the established procedure will not give satisfactory results in case of honey.

We have found that in the ordinary methods of incorporating filter aid in the treatment of honey, large quantities of air become suspended therein, which is considered to be very objectionable, for the reason that air detracts from the appearance of the honey, and is also a factor in hastening granulation.

Honey is easily damaged by heating, either by excessively high temperatures for short periods of time, or for longer periods at lower temperatures. We have found that special methods of heating honey, hereinafter described, are essential in order to overcome this objection.

To overcome the foregoing objections, and as illustrative of the method for practicing our invention, we submit the following preferred example:

A quantity of rapid filtering diatomaceous earth, equal to about ½ per cent. of the weight of the honey to be treated, is prepared in a special form, hereinafter described, and intimately mixed with the honey in a tank, by means of a slow speed agitator, rotating at approximately 25 R. P. M. The honey is then pumped by means of a rotary pump through a metallic coil (which should be immersed in water at a temperature of approximately 170° F.) at a rate that will allow the honey to be heated to full processing temperatures of from 140° F. to 160° F. very quickly. It is then filtered by means of a filter press, after which it is bottled, or placed in other suitable containers. The time required for passage of any one portion of the honey through the heating coil and filter press usually does not exceed 15 minutes.

As a specific instance of how our process can be conducted, the following procedure is described in detail:

Twenty-five hundred pounds of liquid honey are placed in a 225 gallon tank, which should be equipped with agitating means, designed to rotate it about 25 R. P. M. The tank should be equipped with stationary baffles so arranged that a stationary finger comes between the agitating means or each rotating paddle. The surface of the honey in the tank must be at least 2 inches above the uppermost point of the agitating means, in order to avoid incorporation of air into the honey. Twelve and one-half pounds of a rapid filtering diatomaceous earth are suspended in eight gallons of water separately in a 10-gallon metallic container, and the mixture brought to a boil, and boiled for about five minutes, when the suspension is filtered by means of a suction filter. In this way the diatomaceous earth is separated from the excess of water in the form of a soft cake. As soon as the excess water is removed, a honey sirup consisting of about 36 pounds of honey, and about 9 pounds of water are poured over the cake, and the suction continued until the honey sirup just disappears into the surface of the cake. The soft cake is then removed from the suction filter, placed below the surface of the honey in the mixing tank, and the diatomaceous earth uniformly distributed through the honey by agitating means.

The mixture of honey and diatomaceous earth is then allowed to flow from the bottom of the mixing tank through a pipe to a rotary honey pump, which pumps it upward through a metallic coil enclosed in a tank filled with water, the temperature of which is maintained somewhat above that to which it is desired to heat the honey. In passing through the coil, the honey is heated quickly to the full processing temperature, as stated above. From the coil, it passes directly into a filter press having a filtering surface of approximately 20 square feet. The feed to the filter press should be in one of the lower corners of the filter press, and delivery in the opposite upper corner thereof. A light cotton filter cloth, or other suitable filter medium is used to cover the plates. The capacity and speed of the pump is so regulated that an average flow of about 60 gallons of honey per hour is maintained, under which conditions the 2500 pounds of honey are filtered in from 4 to 5 hours. The filtration pressure will usually vary from about 5 pounds per square inch at the beginning of filtration to 50 or 60 pounds per square inch at the end of the filtration cycle. All piping between the pump and press, and the heating coil should be so arranged that no part of it slopes downward, and a gradual and uniform rise is maintained throughout the length of the heating coil. Extracted honey so treated is clear and free from suspended material. Furthermore, no loss or modification of flavor can be detected in the filtered honey, as compared with the original honey. The honey is ready for bottling immediately upon being received from the filter press.

While the foregoing method teaches the use of diatomaceous earth as a filter aid, we are aware that other substances, such as glaucosil, and the like, may be employed as a filter aid.

It is understood that some variations in the proportions of the various ingredients used in the hereinabove described process can be made without essentially changing our invention.

Having thus fully described our invention, what we claim for Letters Patent is:

1. A method for the purification of extracted honey, which comprises mixing the honey with a filter aid which has been treated by suspending it in boiling water to remove adsorbed air from the filter aid particles, followed by treatment with the appropriate quantity of a honey sirup, said sirup consisting of approximately 9 pounds of water to substantially 36 pounds of honey, thereby removing any water wetting the mass, thence subjecting the mass to the action of heat, and thence separating the honey therefrom.

2. A method for improving honey, consisting of incorporating into the honey filter aid, which has been treated by suspending it in boiling water to remove adsorbed air from the filter aid particles, followed by treatment with the appropriate quantity of a honey sirup said sirup consisting of approximately 9 pounds of water to substantially 36 pounds of honey, thereby removing any water wetting the mass, thence subjecting the mass to the action of heat, and thence filtering.

3. A method for removing scum and suspended matter from honey, which comprises incorporating into the honey filter aid which has been treated by suspending it in boiling water to remove adsorbed air from the filter aid particles, followed by treatment with the appropriate quantity of a honey sirup said sirup consisting of approximately 9 pounds of water to substantially 36 pounds of honey, thereby removing any water wetting the mass, thence subjecting the mass to the action of heat, and thence filtering.

4. A method for removing scum and suspended matter from honey, which comprises incorporating into the honey diatomaceous earth which has been properly treated by suspending it in boiling water to remove adsorbed air from the filter aid particles, followed by treatment with the appropriate quantity of a honey sirup said sirup consisting of approximately 9 pounds of water to substantially 36 pounds of honey, thereby removing any water wetting the mass, thence subjecting the mass to the action of heat, and thence filtering.

5. A method for improving extracted honey, and removing the scum and suspended matter therefrom without introducing air therein, which comprises incorporating into the honey filter aid, which has been treated by suspending it in boiling water to remove adsorbed air from the filter aid particles followed by treatment with the appropriate quantity of a honey sirup said sirup consisting of approximately 9 pounds of water to substantially 36 pounds of honey, thereby removing any water wetting the mass, thence subjecting the mass to the action of heat, and thence filtering.

6. A method for improving extracted honey and removing scum and suspended matter therefrom without introducing air therein, which comprises incorporating into the honey diatomaceous earth which has been treated by suspending it in boiling water to remove adsorbed air from the filter aid particles followed by treatment with the appropriate quantity of a honey sirup said sirup consisting of approximately 9 pounds of water to substantially 36 pounds of honey, thereby removing any water wetting the mass, thence subjecting the mass to the action of heat, and thence filtering.

REX E. LOTHROP.
HOWARD S. PAINE.